United States Patent
Lu

(10) Patent No.: US 10,548,268 B1
(45) Date of Patent: Feb. 4, 2020

(54) SOIL MOISTURE AUTOCONTROL SYSTEM AND ITS APPLICATIONS IN SUBSURFACE IRRIGATION, OUTER SPACE AGRICULTURAL FARM, AND CONVERTING OF DESERTS INTO ARABLE FARMS

(71) Applicant: James Cheng-Shyong Lu, Huntington Beach, CA (US)

(72) Inventor: James Cheng-Shyong Lu, Huntington Beach, CA (US)

( * ) Notice: Subject to any disclaimer, the term of this patent is extended or adjusted under 35 U.S.C. 154(b) by 0 days.

(21) Appl. No.: 16/280,987

(22) Filed: Feb. 20, 2019

(51) Int. Cl.
*A01G 25/06* (2006.01)
*E02B 13/00* (2006.01)
*A01G 25/02* (2006.01)

(52) U.S. Cl.
CPC ........... *A01G 25/06* (2013.01); *A01G 25/023* (2013.01); *E02B 13/00* (2013.01)

(58) Field of Classification Search
CPC combination set(s) only.
See application file for complete search history.

(56) References Cited

U.S. PATENT DOCUMENTS

| | | |
|---|---|---|
| 3,819,118 A | 6/1974 | Brock et al. |
| 3,946,762 A | 3/1976 | Green |
| 4,053,109 A | 10/1977 | Gilead |
| 4,221,501 A | 9/1980 | Saburi |
| 4,740,104 A | 4/1988 | Stohr et al. |
| 5,374,138 A | 12/1994 | Byles |
| 5,839,659 A | 11/1998 | Murray |
| 5,938,372 A | 8/1999 | Lichifield |
| 9,668,432 B2 | 6/2017 | Roess et al. |
| 2014/0064852 A1* | 3/2014 | Livvix .................. A01G 25/06 405/51 |
| 2015/0361630 A1* | 12/2015 | Appelboom ............. E02B 7/28 405/104 |
| 2016/0338274 A1* | 11/2016 | Messner ................ A01G 25/16 |
| 2018/0177146 A1* | 6/2018 | Gallegos ................ A01G 25/06 |

* cited by examiner

*Primary Examiner* — Kyle Armstrong
(74) *Attorney, Agent, or Firm* — Mei & Mark LLP; Manni Li

(57) ABSTRACT

A soil moisture auto control system which can be used in subsurface irrigation, outer space agricultural farm irrigation, semi-arid and arid agricultural areas irrigation and nutrients addition, as well as auto watering and nutrients addition devices for flower and/or vegetable pots in indoor planting, by an external negative pressure design system responding to soil moisture needs by plants in the agricultural areas by bi-directional flows arrangements to automatically adjust moisture needs for plants.

12 Claims, 8 Drawing Sheets

SOIL MOISTURE AUTOCONTROL SYSTEM AND ITS APPLICATIONS IN SUBSURFACE IRRIGATION, OUTER SPACE AGRICULTURAL FARM, AND CONVERTING OF DESERTS INTO ARABLE FARMS

BACKGROUND OF THE INVENTION

Field of the Invention

The present invention is in the field of soil moisture automatic control system and equipment. The present invention can be applied to subsurface irrigation of any agricultural farms and greenhouses which are growing crops from soils, or applied to outer space farms where no gravity can assist irrigation, or applied to remediation of deserts and converting them into arable lands, or applied to indoor multiple levels or single planting trays or pots. The present invention can automatically provide suitable moisture contents for vegetations to grow and can reach nearly complete water conservation in agriculture irrigations. The proposed system also can be used to effectively supplying nutrients and/or pesticides, herbicides to soils by the subsurface irrigation system.

Description of the Background Art

It has been widely reported in the open literature that, in general, about 70% of the water withdrawn from freshwater sources globally supports agriculture, while about 20% supports industrial activities, and only 10% is used for municipal supplies. Water withdrawal and consumption are not the same metric and a much greater percentage of the water withdrawn for agriculture is actually consumed as irrigation water while a much smaller percentage of water withdrawn to support industrial and municipal supply is actually consumed and rendered unavailable for other uses. Worldwide, about 93% of the water consumed by humans goes to irrigated agriculture, while only about 4% and 3%, respectively, are consumed by industry and municipal uses. Due to global uneven distribution of freshwater supplies, many regions worldwide are facing serious water shortage problems. Since majority of water resources is consumed by agriculture, and conventional agricultural irrigation methods are wasting a great amount of freshwater, a small saving in irrigation means a big solution to our water shortage problems.

The current irrigation practices used for the above ground (surface) irrigation are usually selected from the following three methods: (1) spray or sprinkler irrigation, (2) flood irrigation, and (3) drip irrigation. Water can be wasted during and after irrigation by the following three pathways: evaporation, surface runoff, and percolation. Although drip irrigation can save more water, it is still cannot prevent the above three types of water loss.

It is generally known that subsurface (below ground) irrigation can save significant amount of water comparing to that of above ground irrigation, and can also provide more effectively in nutrients/herbicides/pesticides supply to soils for crops. Currently more commonly practiced subsurface irrigation methods are (1) subsurface percolation irrigation, (2) subsurface drip irrigation, and (3) subsurface capillary irrigation. Major objectives of replacing surface irrigation by subsurface irrigation are to reduce water loss by evaporation and surface runoff. However, the accompanying problems are high costs of subsurface irrigation system installation, clogging of pipes when buried underground, difficulty of maintenance and repair, water loss through gravity, difficulty in effective moisture and nutrients distribution in soils, and difficulty in effectively controlling water irrigation rates to the real time consumption rates by plants. In order to achieve "no water loss" or nearly no water loss situations the very last problem mentioned above, i.e., controlling irrigation rates equal to that of real time water consumption rates, shall be solved. Only some of the problems mentioned above have been solved by existing inventions.

Among the above listed problems of subsurface irrigation, the issue of water loss through gravity is still not effectively solved by most invented systems. One of the major difficulties is that, for subsurface water movement during irrigation in soils especially under the subsurface percolation or drip irrigation, hydraulic pressures in soil pores shall be sufficient enough to push the moisture migration in soils, in order to increase the irrigation line spacing. In general, water cannot effectively move in soil pores horizontally or near horizontally during irrigation until the entire soil pores are fill with water. In this situation the water may be lost by gravity when soil moisture contents are greater than the "field capacity" during pressurized irrigation of pushing water movement in soils. Although moisture can be migrated in soil by capillary action, but the moisture contents in soils may not be the right levels which plants needs or enough for plant needs after irrigation. Most of the existing subsurface capillary irrigation designs require pressure to supply water from the perforated conduits, or require to saturated soil before capillary front can be move forward. Researches in the past decades have found that optimum moisture contents in soils for the plant needs varied by different types of plant. Even for the same plant the moisture needs will be varied by different growing stages. Therefore, maintaining the right moisture contents in soils responding to real time plant needs are very important, especially when water conservation is concerned. None of the current subsurface irrigation methods, including the existing capillary irrigation methods, can solve the above problems.

Another difficulty in the arid or semi-arid agricultural areas is how to conserve stormwater by collection of the precious water by the subsurface irrigation devices. If the subsurface irrigation system can be also used for collection of extra moisture beyond plant's needs, then perfect prevention of water loss in soils can truly be achieved. That means, if a subsurface irrigation system can be used for both supplying water and collection of water from soils based on the real time water consumption needs by plants, a true perfect prevention of the water loss can be claimed. In order to achieve these situations a bi-direction-flow subsurface irrigation system shall be developed. Only when an irrigation system can response to the real time moisture consumption needs by plants the "no water loss" situation can be truly achieved. The subject inventor will further develop mathematic models later in this document to verify these situations.

Various underground irrigation methods and devices are known in the art to improve some of the problems discussed previously. U.S. Pat. No. 3,819,118 discloses a design of capillary-drip system for subsurface irrigation, by using a capillary tube to function as a metering conduit and by arranging a distribution pipe to have an aperture therein of slightly smaller diameter than the capillary tube, any blockage which occurs in the capillary tube may be readily cleared by withdrawing one end of the aperture and inserting the other end. However, as described by the inventor, for the pore sizes of the capillary tubes used, the working pressures between 6 and 22 psi are needed to maintain 1 quarter to 1 gallon per hour of irrigation water supply to soils. Since the pressure is used to push the water migration in soils, a bi-direction-flow design to automatically maintain soil moistures for plant needs cannot be achieved in this case. Although clogging of pipes and difficulty of maintenance and repair can be solved by the invention, problems such as water loss through gravity, difficulty in effective moisture and nutrients distribution in soils, and effectively controlling water irrigation rates to the real time consumption rates by plants are not solved. Many subsurface irrigation inventions similar to the above invention have been proposed after the above invention was proposed. For example, U.S. Pat. No. 3,946,762 comprising one or more conduits having radially positioned spaced apertures in the walls with the exterior of the conduits covered by a snugly fitting fine mesh fabric sheath was proposed later. Another U.S. Pat. No. 4,053,109 containing two continuous hose like elements extending within one another for water supply and dripping purposes was proposed. Another U.S. Pat. No. 4,740,104 claimed a device with porous double-walled tubes with pore diameter of the inner tube less than 4 micrometers, and pore area of the outer tube reduced at least 20%. All of the above three example patents are basically working on same principles and containing same objective and problems as the previous patent mentioned.

U.S. Pat. No. 4,221,501 proposed a subsurface irrigation system, comprising embedding at least one hollow water permeable member having a number of fine capillary pores in the cultivation soil, and supplying water into the hollow water permeable member to permeate the water from inside to outside the hollow water permeable member through its porous wall. The invention further provides the system with two water tanks for water supply purpose, one with a positive water pressure and the other with same negative pressure or higher than that of the soil negative pressures, to supply water based on the "water absorptivity of the soil". In the design proposed by the invention, it is believed that water loss through gravity may be reduced or eliminated if the soil moistures can be kept below field capacities. However, difficulty in enough and effective moisture and nutrients distribution in soils, difficulty in effectively controlling water irrigation rates to the real time consumption rates by plants, and the bi-direction-flow situation to divert extra water back to the reservoir for conservation purposes are still not solved in the invention.

In order to prevent gravity water loss and more effectively to migrate and hold moisture in soils, several patents are developed, such as U.S. Pat. Nos. 5,374,138; 5,839,659; and 5,938,372. These patents usually provide an impermeable material or using hydrophobic chemicals to render soils with less permeability beneath the subsurface irrigation systems. U.S. Pat. No. 5,374,138 includes a water supply line, a header conduit, a plurality of water distribution branches, and each water distribution branch includes a water-emitting conduit above the V-shape impermeable layer. Pore sizes of the water-emitting conduit are not addressed in the invention, but using capillary pressure in the soil to move the moisture was mentioned. In U.S. Pat. No. 5,839,659, a system comprising one or more perforated conduits sandwiched between an upper layer of a capillary cloth and a lower layer of a capillary cloth and/or a water impermeable material was invented. The inventor claimed that his system can provide irrigation water, and in the same time can achieve many objectives such as preventing root penetration, preventing soil particles blockage of conduit perforations, preventing soil erosion in slope planting, facilitating drainage and preventing water logging, preventing rising groundwater to create soil salination, supplying air to preventing anaerobic condition in soils, and providing oxygen to aerobic bacteria which are needed in agricultural area. In U.S. Pat. No. 5,938,372, a system including an underlayment of water-resistant material, a water supply conduit, a plurality of porous water distribution conduit, a fibrous layer diffuser, and a coarse sand layer above the fibrous diffuser were proposed. The invention is basically similar to U.S. Pat. No. 5,839,659 both in design, functions, and objectives. All the above three immediate mentioned inventions can achieve the purposes as listed in U.S. Pat. No. 5,839,659, however, difficulty in effectively controlling water irrigation rates to the real time consumption rates by plants, and collection of extra moisture beyond plant's needs with the bi-direction-flow function are still cannot be achieved.

More recently, U.S. Pat. No. 9,668,432 B2 also provides basically the same type of system as discussed above. The system includes at least one perforated tube, a web made of a first capillary textile, and a casing made of a second capillary textile. Water supply is driven by a pressurized pump to enter the perforated tube and seeping into the web from the casing, and then be carried across the web by capillary action. Again, the invention also has difficulty in effectively controlling water irrigation rates to the real time consumption rates by plants, and cannot collecting of extra moisture beyond plant's needs with the bi-direction-flow function.

SUMMARY OF THE INVENTION

The objectives of the present invention are to provide a soil moisture auto control system which can be used in subsurface irrigation, outer space agricultural farm irrigation, desert soil moisture control for vegetations, and indoor irrigation system for growing vegetation and flowers. The present invention can provide bi-directional flow in the subsurface irrigation system to automatically adjust moisture needs for plants. The proposed system can be used in any agricultural farms or greenhouses where conservation of irrigation water required, and liquid nutrient addition is needed. The proposed system also can be used in agricultural farms where no gravity is present such as in the outer space farms. The proposed system is ideal for subsurface irrigation in deserts to assist conversion of deserts into arable lands. The proposed system is also useful for domestic and commercial applications as an auto watering device for flower and/or vegetable pots.

BRIEF DESCRIPTION OF THE DRAWINGS

The present invention is described in more detail by way of example only, with reference to the accompanying drawings. The following drawings are provided:

FIGS. 1A to 1D provide an illustration diagrams showing the basic components of the subsurface auto irrigation system of the present invention, among which, FIG. 1A shows an overview of the irrigation piping layout in soil of the subsurface auto irrigation system of the present invention; FIG. 1B shows the cross-section view through B-B' of FIG. 1A; FIG. 1C shows an enlarged view of a moisture diffuser probe 1 shown in FIG. 1A; and FIG. 1D shows enlarged cross section view through A-A' of FIGS. 1A and 1C.

FIG. 2A shows the top view of the control apparatus of the auto irrigation system of the present invention, and FIG. 2B shows the side view the control apparatus of the auto irrigation system of the present invention.

FIG. 3A shows a cross section view of the embodiment; and FIG. 3B shows front view of the embodiment.

FIG. 4A shows a multiple levels of the indoor vegetable/flower growing device with the auto irrigation system of the present invention; FIG. 4B shows a cross section view of the embodiment along line C-C' in FIG. 4A; FIG. 4C shows the partially enlarged view of the roof light collector 38, building wall light collector 39, and an optical fiber 40 for light transmission in the indoor vegetable/flower growing of the present invention.

FIGS. 5A to 5D show water loss and irrigation water needs affected by the different irrigation methods, root zone depths, soil permeabilies, and surface runoff coefficients, among which, FIG. 5A shows the water loss caused by different irrigation methods vs. root zone depths, where the horizontal axis shows root zone depth in millimeters (mm), and the vertical axis shows irrigation water loss percentage (%); FIG. 5B shows the water loss caused by different irrigation methods vs. root zone depths, where the horizontal axis shows root zone depth in millimeters (mm), and the vertical axis shows irrigation water loss ql in millimeters (mm); FIG. 5C shows the effects of soil permeability on total irrigation water needs, where the horizontal axis shows soil permeability in millimeters per hour (mm/hr), and the vertical axis shows total irrigation water needed in millimeters (mm); and FIG. 5D shows the effects of surface runoff coefficient on total irrigation water needs, where the horizontal axis shows surface runoff coefficient, and the vertical axis shows total irrigation water needed in millimeters (mm).

Figure 5A:
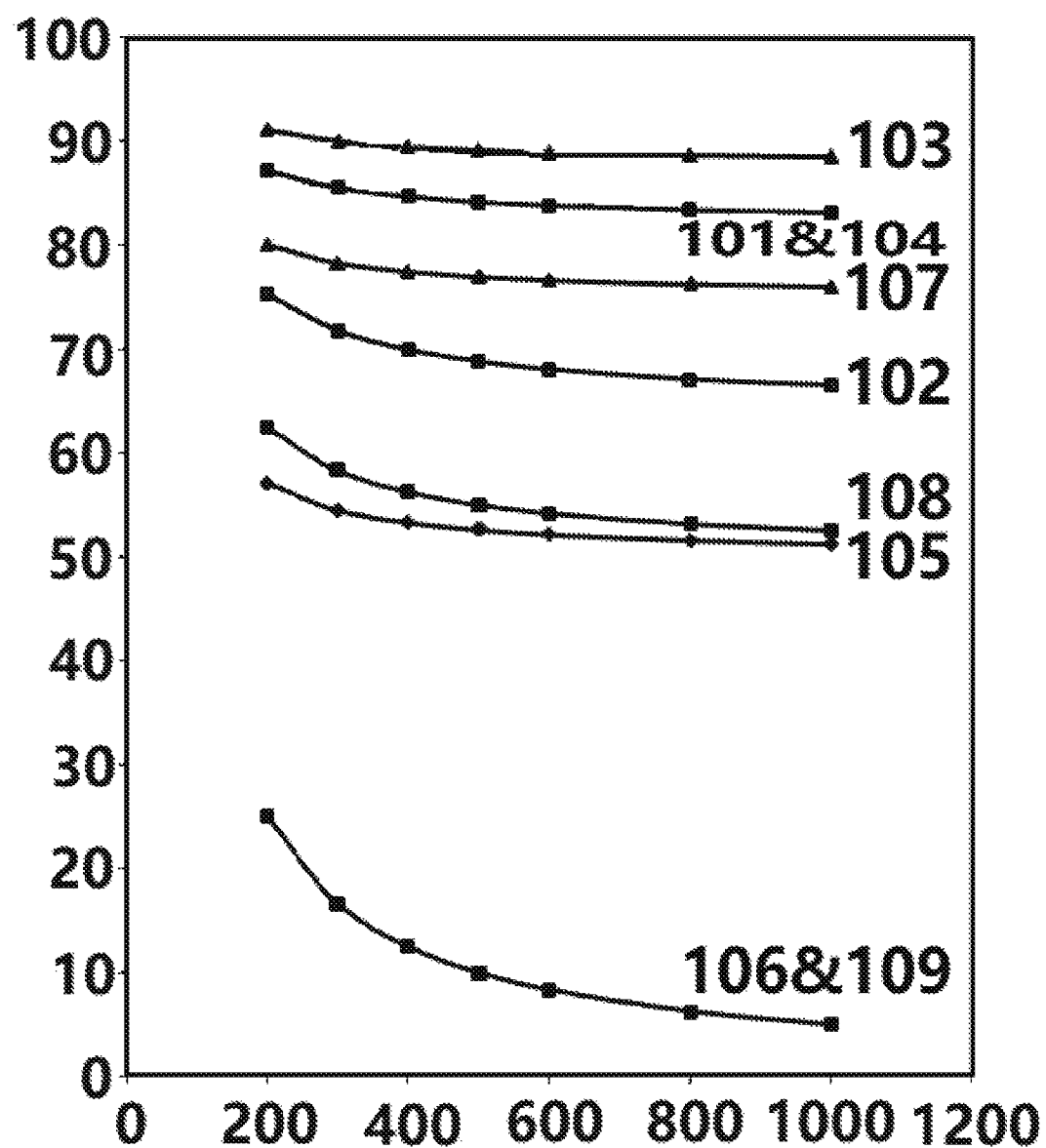
Figure 5B:
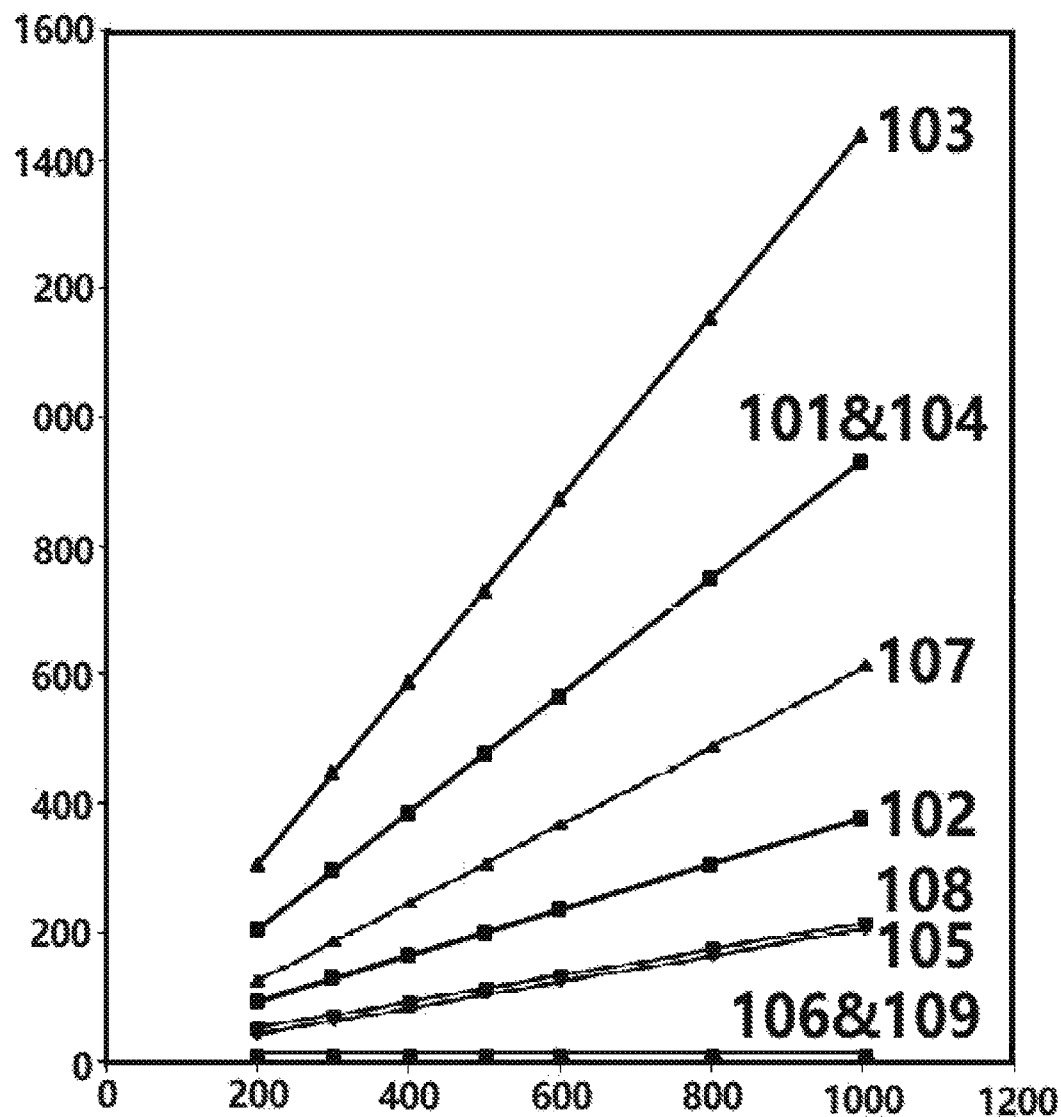
Figure 5C:
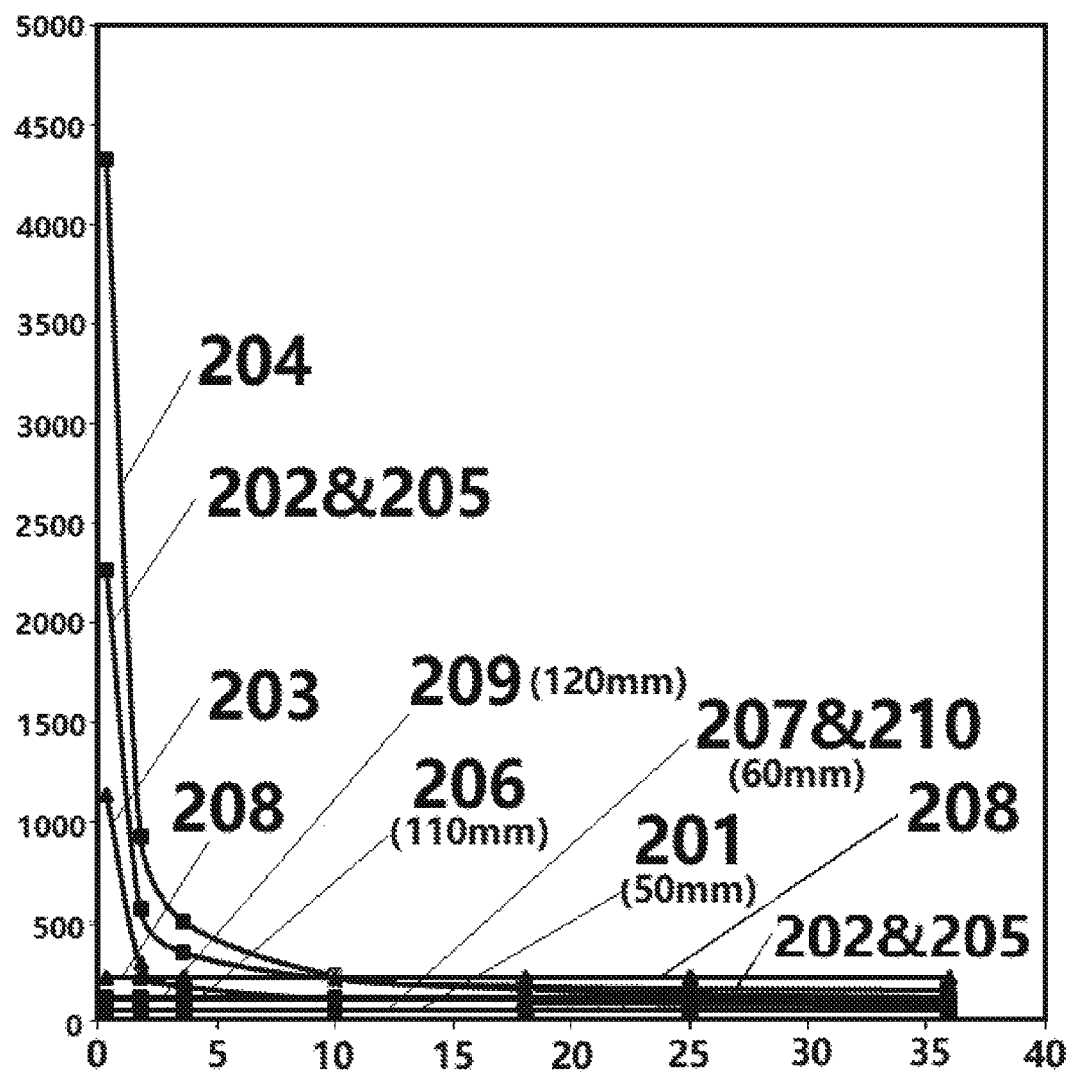
Figure 5D:
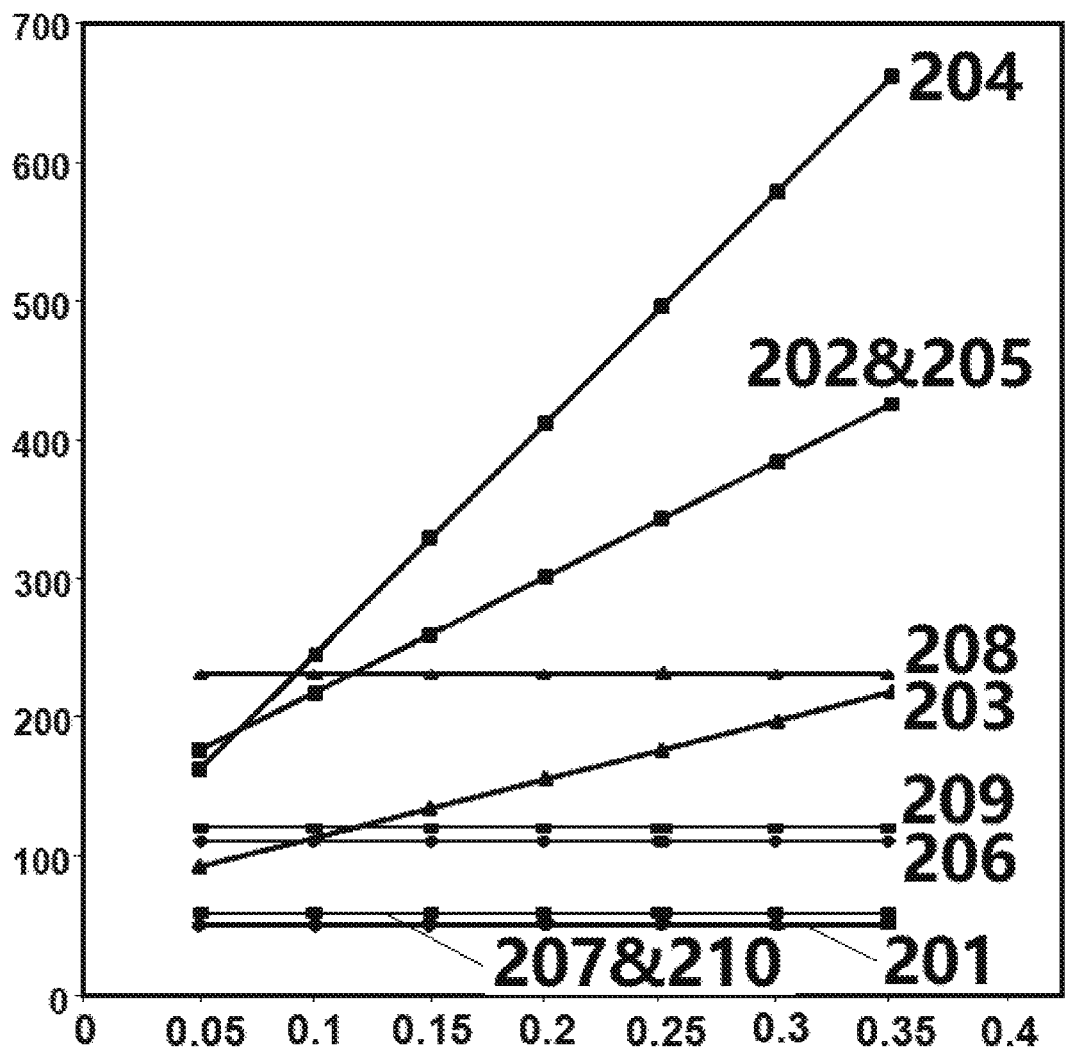

Reference numbers used in FIGS. 5A and 5B are as follows: 101—above ground spray & flood irrigation; 102—above ground drip irrigation/case 1; 103—above ground drip irrigation/case 2; 104—above ground drip irrigation/case 3; 105—subsurface percolation irrigation/case 1; 106—subsurface percolation irrigation/case 2; 107—subsurface percolation irrigation/case 3; 108—subsurface percolation/capillary irrigation; and 109—subsurface drip irrigation. Reference numbers used in FIGS. 5C and 5D are as follows: 201—Irrigation in the entire root zone to field capacity; 202—above ground spray & flood irrigation; 203—above ground drip irrigation/case 1; 204—above ground drip irrigation/case 2; 205—above ground drip irrigation/case 3; 206—subsurface percolation irrigation/case 1; 207—subsurface percolation irrigation/case 2; 208—subsurface percolation irrigation/case 3; 209—subsurface percolation/capillary irrigation; and 210—subsurface drip irrigation.

DETAILED DESCRIPTION OF THE INVENTION

Evaporation, surface runoff, and percolation are considered to be the major causes of water loss during above ground irrigation. Subsurface irrigation methods are generally suggested for the conservation of water to replace the above irrigation practices. Subsurface irrigation is also suggested to be a better method for more effective supply of soluble organic nutrients/pesticides/herbicides to soils for crops.

However, the current subsurface irrigation methods and equipment still cannot solve many of the difficulties and problems associated with the irrigation. In order to achieve better situations for water conservation and to respond to the real time of plant water consumption needs, better subsurface irrigation methods and equipment are needed, in order to solve:

(1) Water percolation loss through gravity is still not effectively solved by most subsurface irrigation designs. Subsurface irrigation water may be lost through gravity when soil moisture is greater than the field capacity when subsurface percolation or drip irrigations are used. Especially, when water is forced to migrate horizontally or near horizontally to cover a larger irrigated area, or irrigation time is too lengthy causing over irrigation, more water will be lost.

(2) Best soil moisture levels responding to different stages of plant growing needs cannot be automatically controlled and adjusted by any of the current subsurface irrigation systems, so perfect irrigation systems to avoid the water loss and promote the plant growth are inexistent.

(3) No subsurface irrigation system is currently available which can be also automatically collecting of extra water applied to soils and conserved for future use, such as collecting percolation water from a large storm by the subsurface irrigation system, in this situation, perfect prevention of water loss in soils can truly be achieved. This is especially important for arid and semi-arid agricultural areas. To achieve this situation, a system with an automatic bi-directional flow capability is needed.

(4) Problems such as prevention of clogging of subsurface irrigation pipes, hardening of soils due to long period use for the inorganic nutrients addition, and ease for maintenance and repair of the subsurface irrigation system are not fully solved.

(5) For areas where the gravity is absent such as agricultural farms in the outer space, the irrigation system for soil-growing vegetations is still lacking.

The present invention solves the above difficulties and problems. The basic principles, conditions for best water conservation suggestions, and applicable methods and equipment, and operational procedures are as follows.

1. Basic Principles, and Comparisons of Different Irrigation Methods 1.1 Basic Principles of the Present Invention In order to explain the principles of the present invention, the basic theory is presented below. There are many documents reported in the past regarding moisture retention by soils, especially addressed in the literature of soil physics, hydrology, fluid mechanics, and soil mechanics. Soil moisture retention capability is generally represented by energy or pressure relationships as follows:

$$\psi_t = \psi_g + \psi_p + \psi_m + \psi_o \quad (1)$$

wherein $\psi_t$=soil water potential; $\psi_g$=gravitational potential; $\psi_p$=pressure potential; $\psi_m$=matric potential; and $\psi_o$=osmotic potential.

Among the above variables the $\psi_g$ and $\psi_p$ are usually existed in positive pressure values, while $\psi_m$ and $\psi_o$ usually in negative values. If water is applied from above the ground surface, such as rain water or above ground irrigation, the water could saturate the soil pore spaces and will continue flow downward by the gravitational potential. But when the source of water supply is stopped, the saturated downward flow may gradually cause soils to become unsaturated. In this unsaturated situation, the matric potential and osmotic potential will cause the water pressure in soils become negative pressure. When the moisture content reduction in soils are approaching the Field Capacity ("Field Capacity" is defined as the maximum moisture content which the soil can hold against gravity), if no other factors reducing the moisture contents such as evaporation, evapotranspiration, or moisture consumption by microorganisms, the negative pressure will persist and moisture flowing downward will stopped. If sources of water are from beneath or lateral of the soils, such as subsurface irrigation or groundwater intrusion, pressure potential $\psi_p$ will cause the water pressure in soils becomes positive and cause water migration also. For subsurface irrigation, the mechanical pressure potential is needed to force the soils become saturated and causing water to flow in the pore spaces in all directions. The matric potential could cause the moisture to further migrate in the saturated or unsaturated conditions, as usually called capillary water. The matric potential causing moisture migration is a result of soil particles' adhesion and cohesion forces and is expressed as follows:

$$\psi = (2\sigma^{lg} \cos \theta)/r \quad (2)$$

wherein, $\psi$=surface tension, in the cgs system, the unit is ergs/gram; $\sigma^{lg}$=surface tension coefficient, is 72.75 dynes/cm water to air at 20° C.; $\theta$=wetting angle between water and soil particle; and r=average radius of the soil pore spaces.

In the above case, when sources of water supply are removed, by evaporation and/or plant uptake (i.e., osmotic pressure), negative pressures formed in soils. Continuing removing moisture contents will cause more negative pressure in soils. Because of the negative pressure in soils, a large moisture retention capability formed. In the situation, soils behave capability to absorb moisture without the needs of external pressures/energy addition. Soils with more negative pressure will have larger capability to attract moisture. The present invention is based on the above natural phenomena to design an automatic moisture supply or absorption system which responding to soil moisture contents/negative pressures. The negative pressures as shown in Equation (1) above are the major forces to cause the moisture movement in soils. Three major forces (i.e., moisture attraction force by soil particles, adhesion/cohesion forces of water, and osmotic pressure by plants) are interact together to cause moisture movements in soils. If the formed negative pressure in soils can be controlled, the moisture contents can therefore be controlled.

The system of the present invention utilizes the phenomenon of relationships between negative water pressure and moisture contents of soils. In order to achieve the moisture automatic control situation to maintain real time moisture needs for plants at any given moment, the present invention includes a combination of major equipment such as detecting probes, bi-direction flow tubes, bi-direction flow pipes, water reservoir and pressure control tank, and water purification system as further disclosed.

1.2 Comparisons Among Different Irrigation Methods

The ultimate purpose of the present invention is to improve the current irrigation technologies to achieve nearly perfect water conservation during and after irrigation and to provide real time moisture demands of plants. As disclosed above, the current irrigation practices used for the above ground irrigation are usually in the following three methods: (1) spray or sprinkler irrigation, (2) flood irrigation, and (3) drip irrigation. Currently more commonly practiced subsurface irrigation methods are (1) subsurface percolation irrigation, (2) subsurface drip irrigation, and (3) subsurface capillary irrigation. It is generally believed that subsurface irrigation can conserve more water than that of above ground irrigation. The major water loss caused by above ground irrigation usually from three areas: evaporation, surface runoff, and percolation. Factors affecting the rates of water loss of the above ground irrigation involve also the surface infiltration rates of water, permeabilities of the soil, root zone depths, and selected irrigation flow rates. Although the subsurface irrigation can avoid evaporation and surface runoff, factors such as percolation of water, soil void ratios, field capacity, root zone depths, irrigation rates, water pressures used, and capillary height can affect water conservation results greatly. Therefore, in reality, if the subsurface irrigation is not controlled properly it may not achieve better water savings than that of above ground irrigation. In order to assess the advantages of the present invention to various conditions used by both the above and below ground irrigations, comparisons of different irrigation methods at different conditions are necessary. These types of information are usually lacking or incomplete in open literature.

To evaluate the surface runoff during above ground irrigation, numerous empirical models were proposed in hydrology studies, such as Rational Equation, Curve Number Method, Cook's Method, etc. There are even more empirical models, in the number of hundreds, were proposed in the past for evapotranspiration estimation. In order to simplify the calculation for the irrigation water loss, all irrigation water needs are based on total water amount to satisfy the entire root zone to field capacity. The total water loss for irrigation is calculated as follows:

$$q_l = q_e + q_r + q_p = E(t_{Rd}) + q_{e50} + rI_R(t_{Rd}) + R_d(V_s - V_f) \quad (3)$$

Wherein, $q_l$=total water loss during irrigation (unit in mm or cm); $q_e$, $q_r$, and $q_p$=evaporation, surface runoff, and percolation water loss, respectively during irrigation (mm or cm); $q_{e50}$=water evaporation from the top 5 cm of soil after irrigation; E=evaporation rate during or after irrigation (mm/hour); $I_R$=rate of water irrigation, or irrigation rate in unit area (mm/hour); r=runoff coefficient (based on the above mentioned Curve Number method or Rational Method, the r values are usually in the range of 0.1 to 0.35); $R_d$=root zone depth (mm or cm);

$t_{Rd}$=time needed to saturate the entire root zone (hour) and is as follows:

$$t_{Rd} = R_d/Ksi \quad (4)$$

K=permeability of the soil (cm/sec or mm/hour; Ks representing permeability at saturation, Ku representing permeability at unsaturation conditions); i=hydraulic gradient; $V_s$=soil porosity, or volume ratio of soil reaching saturation (%, volume ratio); and $V_f$=soil field capacity (%, volume ratio).

Estimation of Water Loss by Spray Irrigation and Flood Irrigation:

Water downward movement in soil usually require the saturation of the top soil layers by spray and flood irrigation. For comparison, drip irrigation can assume that water infiltration into soil (more slowly) can form saturation flow (calculated by Ks) or unsaturation flow (calculated by Ku). It is generally assumed that the evaporation occurred only in the top 5 cm of the soil depth. It is also assuming that the saturated water (means $V_s$ water content) will be lost by gravity until field capacity (means $V_f$ water content). Uses of the above assumptions will not affect the comparisons of water loss because evaluation of water loss by all irrigation methods are estimated based on the same calculation models. In general, due to $q_e$ and $q_r$ cannot be avoided, spray and flood irrigation may cause the largest water loss comparing to other methods, if $q_e$ and $q_r$ are not properly controlled. If root zone depth, evaporation rate, soil permeability, and other soil $V_s$ and $V_f$ are kept constant, water loss through spray or flood irrigation will be proportional to irrigation rate $I_R$ and irrigation period selected. However, when $I_R$ is controlled, $q_r$ of the above ground drip irrigation can be controlled and avoided. No evaporation can be avoided for all above ground irrigation methods. The longer the irrigation period, the greater amount of water loss will happen. Combining Equations (3) and (4) above, water loss $q_l$ for spray and flood irrigation methods is estimated as follows:

$$q_l = R_d(E/K_s + r\, I_R/K_s + V_s - V_f) + q_{e50} \qquad (5)$$

Estimation of Water Loss by Above Ground Drip Irrigation:

Because of the complexity of above ground drip irrigation, water loss shall be classified into three conditions:

(1) Irrigation water is saturated in the above soil layer before downward flow occurs during Irrigation. If the irrigation water amount just satisfied the entire $R_d$ to $V_f$, the $q_l$ can be calculated by the following equation:

$$q_l = (E + rI_R)[(R_d V_f)/(K_s V_s)] + q_{e50} \qquad (6)$$

(2) Irrigation water is flowing slowly downward during irrigation. If the irrigation water amount can be controlled to achieve the entire $R_d$ to $V_f$, there will be no $q_p$ loss, the $q_l$ can be calculated by the following equation:

$$q_l = (E + rI_R)[(R_d V_s)/(K_s V_f)] + q_{e50} \qquad (7)$$

(3) The entire $R_d$ is reaching saturation condition during drip irrigation, the $q_l$ can be calculated by the following equation:

$$q_l = (E + rI_R)(R_d/K_s) + R_d(V_s - V_f) + q_{e50} \qquad (8)$$

Estimation of Water Loss by Subsurface Irrigation:

Comparing to above ground ground irrigation, subsurface irrigation in general can avoid evaporation and surface runoff water losses. However, percolation loss of water is still not preventable, unless there are special percolation prevention methods provided, or strict control on irrigation rates and irrigation time period. Almost all conventional subsurface irrigation methods involving application of pressure for subsurface water movement. This situation of water movement by pressure can cause pore spaces saturated and, therefore, causing water percolation by gravity. Great amounts of water losses could also occur for conventional subsurface irrigation affecting by variables such as irrigation rates, depths of porous irrigation pipes, root zone depths, irrigation periods, and soil types. Estimation of water losses by subsurface irrigation shall be considered by the following five conditions:

(1) Porous irrigation pipes are located in the shallow area of $R_d$ (usually deeper than 5 cm to avoid evaporation), water movement occurs when soils in the above layers are saturated before water can be migration downward or horizontally (in the case of low soil permeability). Irrigation is stopped immediately when entire $R_d$ is saturated. The water loss in the situation can is estimated as follows:

$$q_l = R_d(V_s - V_f) + 50 V_f \qquad (9)$$

(2) Porous irrigation pipes are located in the shallow area of $R_d$ and water movement occurs when soils in the above layers are saturated before water is migration downward or horizontally. If moisture contents of the entire root zone can be controlled at field capacity, percolation water loss is nil. In this case, if the above mentioned saturated soil depth is $R_s$, which is estimated as follows:

$$R_s = (V_f/V_s) R_d \qquad (10)$$

If irrigation water can be stopped when $R_s$ reached, the entire $R_d$ can reach field capacity, the water loss is estimated as follows:

$$q_l = 50 V_f \qquad (11)$$

(3) Porous irrigation pipes are located at or greater than $R_d$ depth, and no water prevention liner is beneath the porous pipe. Under this situation the water move upward requiring saturated hydraulic pressure and capillary force. In order to satisfy Equation (2) above, there are two types of saturated layers, the first saturated layer formed at the bottom (expressed by $R_{s1}$ depth), then form another saturated layer above by capillary force (expressed by $R_{s2}$ depth). The total water depth is expressed by $R_s$ as follows:

$$R_s = R_{s1} + R_{s2} \qquad (12)$$

In real situation, due to no water prevention liner, in order for Rd to reach Vf, Rd needs to reach saturation first. So the irrigation water loss is as follows:

$$q_l = 2 R_d (V_s - V_f) + 50 V_f \qquad (13)$$

(4) Same conditions as (3) above, but with a water prevention liner beneath the porous pipe. In the situation, except sandy or course silty soils, the saturation layer $R_s$ would be too large and impractical. In the applicable ranges, the water loss is estimated as follows:

$$q_l = R_d V_f + 50 V_f \qquad (14)$$

(5) Porous irrigation pipe is located at Rd depth. Using drip irrigation, the irrigation water loss can be estimated:

$$q_l = 50 V_f \qquad (15)$$

In order to compare water conservation status among different irrigation methods, they should be evaluated at same conditions on various factors including total irrigation water requirements, water loss, and effective water amount remaining in the root zone which can be used by plants. The total irrigation water needs ($q_T$) and effective water amount ($q_a$) are estimated by the following two equations:

$$q_T = q_a + q_l \qquad (16)$$

$$q_a = R_d V_f - 50 V_f \qquad (17)$$

Due to the complexity of the influencing variables for the evaluation of different irrigation methods, the clayey silt soil is selected as examples: $R_d$ range selected for evaluation is in the range of 200 mm to 1000 mm. The following variable data are selected for evaluation: Ks=3.6 mm/Hour, r=0.25, E=500 mm/Year, $V_s$=40%, and $V_f$=20%. $R_d$=300 mm is selected when comparisons of influences of r and K are evaluated. The selected data are then calculated by Equations (3) to (17) as shown above for evaluations. Due to the complexity of calculations, only final calculation results are presented in FIGS. 5A to 5D based on the above assumptions. In the evaluation processes, some of the irrigation methods are affected by different conditions, such as for above ground drip irrigation which can be affected by three type of cases (as shown by Equations (6) to (8)) and for subsurface irrigation which can be affected by five type of cases (as shown by Equations (9) to (15)) as disclosed above. Based on calculated results by using Equations (3) to (15), as shown in FIGS. 5A and 5B, it is found that the amount of water loss is in the following order based on the above assumptions (from most serious water loss to the least serious water loss by different irrigation methods):

Above Ground Drip Irrigation (Case 2 in the above discussion, shown as Reference No. 103 in FIGS. 5A and 5B)>Above Ground Spray and Flood Irrigations (101 in FIGS. 5A and 5B), and above ground drip irrigation (Case 3; 104 in FIGS. 5A and 5B)>Subsurface Percolation Irrigation (Case 3; 107)>Above Ground Drip Irrigation (Case 1; 102)>Subsurface Percolation/Capillary Irrigation (108)>Subsurface Percolation Irrigation (Case 1; 105)>Subsurface Percolation Irrigation (Case 2; 106))>Subsurface Drip Irrigation (Case 5; 109).

In the above assumed conditions, it is found that water loss can be ranged from 5 to 90% due to different irrigation methods used. For water conservation purpose, it is very important to select the right irrigation method and irrigation conditions. The above cases and examples show that subsurface irrigation methods usually can achieve better water loss prevention.

Two variables, soil permeability and surface runoff coefficients, are selected to show effects of on the total irrigation water needs, results are shown in FIGS. 5C and 5D. Calculations are based on Equations (16) and (17), which $q_l$ in Equation (16) are from Equations (5) to (15) for various irrigation methods. Under the selected assumptions, it is shown that the above ground drip irrigation (Case 2; 204), above ground spray and flood irrigations (202), above ground drip irrigation (Case 3; 205) are the worst methods in terms of water needed for the irrigation. Subsurface drip irrigation (210) and subsurface percolation irrigation (Case 2, 207) are better methods in terms of water conservation. For comparison purpose, if an irrigation method (201) can maintain the entire root zone at or below field capacity during the entire irrigation period, the best water conservation conditions can be achieved among the compared methods.

Comparing to the above existing irrigation methods, water supply to plants by the subsurface irrigation method of the present invention is based on unsaturated flow in soils responding to the real needs of moisture by plants. Supply of moisture to soils by using the method of the present invention is always kept below field capacity, therefore, the water percolation by gravity can usually be avoided. The irrigation probes are located below 5 cm of the ground surface as further disclosed below, means that, no significant evaporation water loss will occur. The above situations can result in $q_T$ equal to $q_a$ in Equation (16) shown above. As a result, $q_c$ is equal to zero based on Equation (16). Therefore, in theory, the subject subsurface irrigation invention can achieve nearly zero water loss situation. In the case of non-irrigated water supply to an agricultural field, such as water from a storm, the probes of the present invention can serve as moisture reduction device to absorb moisture from soils and diverting to the water reservoir, to be further delineated later. The present invention is different from the existing subsurface capillary method, which usually requires the saturation condition in soils in order to effectively move water upward or sideward. In the latter situation, if there is no water prevention liner below the irrigation probes for the subsurface capillary irrigation methods, the water percolation loss can not be avoided. Therefore, based on above evaluations, the present invention can provide a very different approach to the existing irrigation methods for water conservation. As will be further delineated, the present invention is designed according to the plant moisture needs at various stages of the plant growing conditions. When soil moisture is beyond the plant needs at that moment, such as after a storm, moisture will be diverted away from the soils by the same irrigation system. However, when soil moisture contents are below the real time plant needs, the designed probe will supply water from the reservoir, to maintain the moisture contents always in the levels which responding to the plant needs. This type of bi-directional flow design responding to the real time moisture needs by plants for irrigation purpose is still inexistent in existing patents and open literature.

2. Processes and Apparatus Involved in the Overall System

Figure 4A:
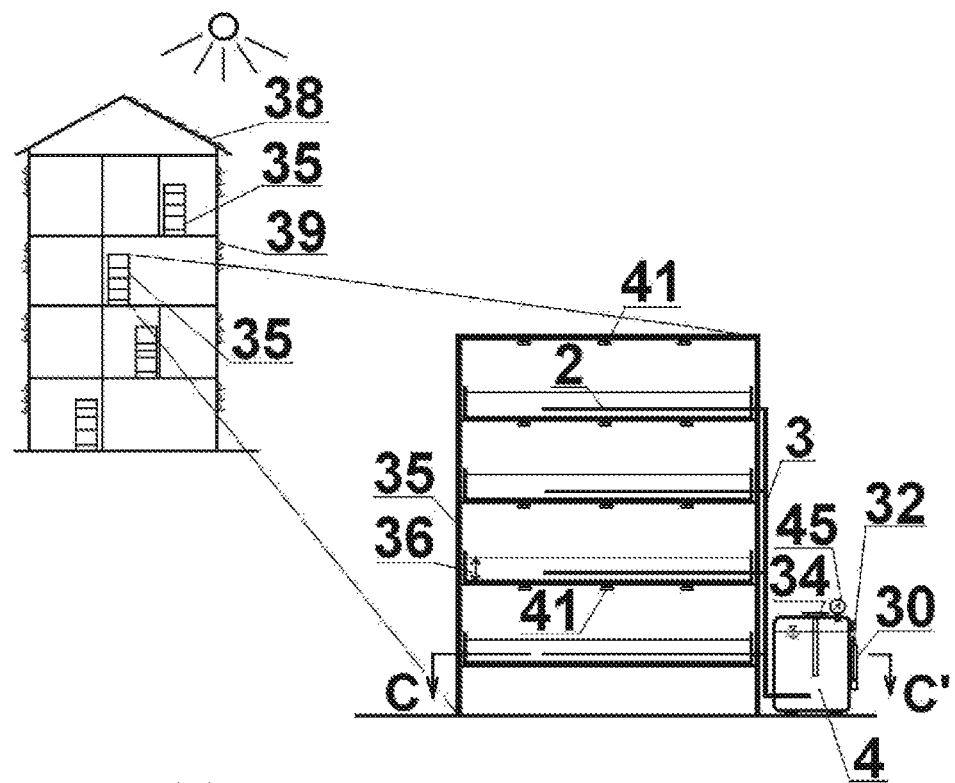
FIGS. 4A through 4C show an embodiment of the indoor vegetable/flower growing device applying the auto irrigation system of the present invention, where
Figure 4C:
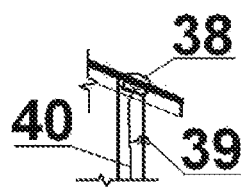
Figure 4B:
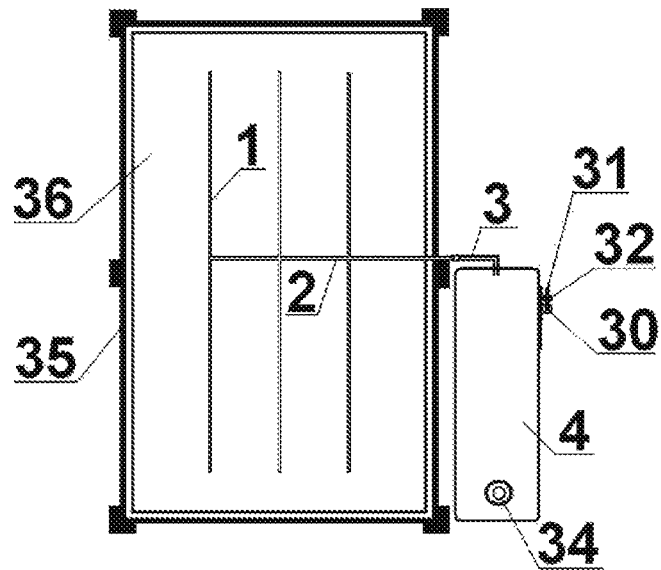

As shown in FIGS. 1A to 1D and 2A to 2B, the major apparatus of the present invention include moisture diffuser probe 1, bi-direction-flow branch conduit 2, bi-direction-flow main conduit 3, reservoir and pressure control tank 4, water purification system 5, water collection tank 6, and equalization tank 7. In application of the subject system, some other equipment may be added when necessary. Such as in irrigation of desert farms, to collect extra rain storm water, a liner or a hydrophobic layer 42 can be arranged below the moisture diffuser probe 1, a porous drain pipe 21, and a drainage pipe 17. If the subject system is used indoor, roof light collectors 38, building wall light collectors 39, optical fibers 40, light dividers/illuminators 41, and planting trays 36, as shown in FIGS. 4A to 4C, used as further disclosed.

Figure 1A:
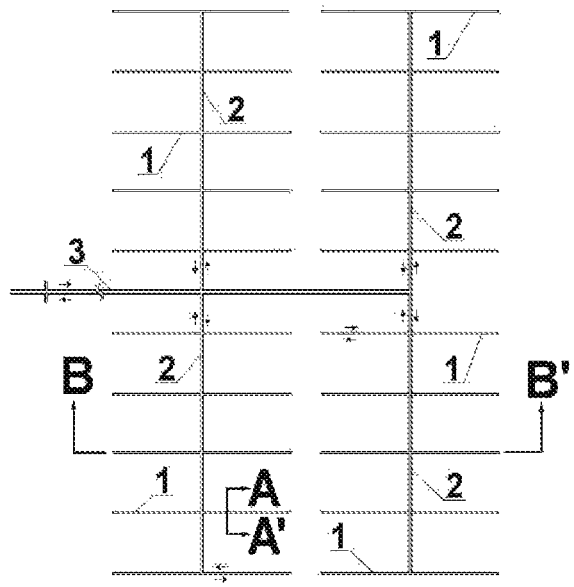
Figure 1B:
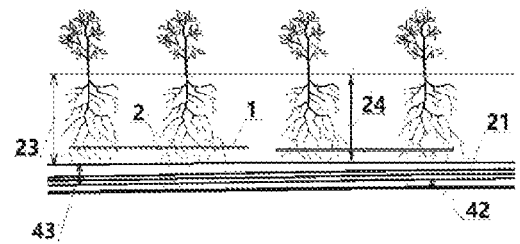

One of the most important apparatus in the system of the present invention, which can detect soil moisture contents continuously and in the same time serves as water diffuser and extra water collector, is the moisture diffuser probe 1. As illustrated in FIGS. 1A and 1B, for horizontal irrigation pipe arrangements, a plurality of moisture diffuser probe 1 is buried in the root zone 24 farm land soil 23 usually arranged at $\frac{2}{3}R_d$ depth or greater than Rd depth when plants shall be planted in rotation and the irrigation system is remaining there for a longer time period. The moisture diffuser probe 1 also can be arranged vertically, such as surround a tree immediately outside the roots in the root zone area. Or arranged in the indoor vegetable or flower planting trays 36 as shown in FIGS. 4A and 4B.

Figure 1C:
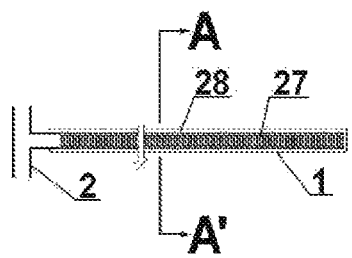
Figure 1D:
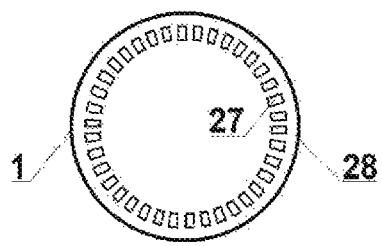

As shown in FIGS. 1B through 1D, the structure of the moisture diffuser probe 1 contains two layers of porous materials. The inner layer 27 can be made of hard or soft relative inert materials such as ceramic, glass, stainless steel, or plastic materials. The shape of the moisture diffuser probe 1 can be tubular, disc, or irregular shapes. The major functions of this inner layer 27 are to detect and control the negative pressure in soils, supplying irrigation water and/or liquid organic fertilizers, pesticides/herbicides, and to collect extra moisture beyond plant needs, means, providing bi-directional flows. The outer layer 28 of the moisture diffuser probe 1 is a protection layer of the inner layer 27, and to filter unwanted materials (such as clayey particles and bio-flocs) into the probe. Materials selected for the outer layers are inert porous materials, which the pore sizes are greater than that of the inner layer 27 but smaller than that of the surrounding soil particles, such as geofabrics, porous ceramic, glass, metals, plastics, and fabric filters. Fine sands are usually provided outside of this outer layer 28 for extra protection, but it is not mandatory. The pore sizes of the inner layer 27 require to be smaller than the sizes of the surrounding soil particles. In order to achieve better function, the maximum pore sizes of the inner layer 27 is estimated as follows: ranges of the maximum pore size diameter of the inner layer 27=(P10)×p to (P50)×p. Where P10 is the size of 10% of diameters of clay particles (or silty particles if clay is absent) in the soil sample can pass through. And P50 is the size of 50% of diameters of clay particles (or silty particles if clay is absent) in the soil sample can pass through. Where p represents the average percentage of porosity of soils. Dimensions of pore sizes are continuously enlarging from the inner layer 27, to outer layer 28, and to outside fine sands. For horizontal arrangements of tubular moisture diffuser probes 1, the spacing of tubular pipes can be as small as 10 cm to as large as 2 m or larger, depending on types of soils in the planting area. Ranges of negative pressure needed are correlating to moisture levels in soils, depending on plant needs. Depths of the moisture diffuser probe 1 should be buried 5 cm below soil surface in the planting area, for better results shall be 15 cm below soil surface.

The moisture diffuser probe 1 is connected to a bi-direction-flow branch conduit 2, as shown in FIGS. 1B, 1C, 1D, 2B, 4A, and 4B. The bi-direction-flow branch conduit 2 materials can be plastics, glass, or ceramics, and diameters can be ranged from several mm to as large as 5 cm or larger. A plurality of branch conduit 2 is connected to a bi-direction-flow main conduit 3 for moisture movements. Diameters of the bi-direction-flow main conduit 3 is larger than that of the branch conduit 2. Selection of sizes of the main conduit 3 is based on water needs of the irrigation area and return flow quantities caused by large storms. Diameters can be as large as 20 cm, or larger depending on calculations. Materials selected for the main conduit 3 is usually plastics for lower costs.

Figure 2A:
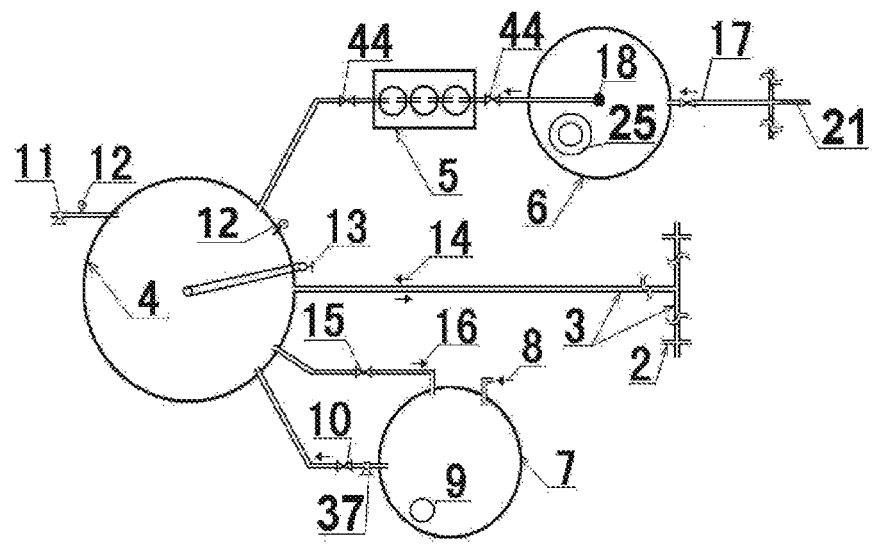
FIGS. 2A and 2B show the arrangement of the control apparatus of the auto irrigation system of the present invention in a large scale, where
Figure 2B:
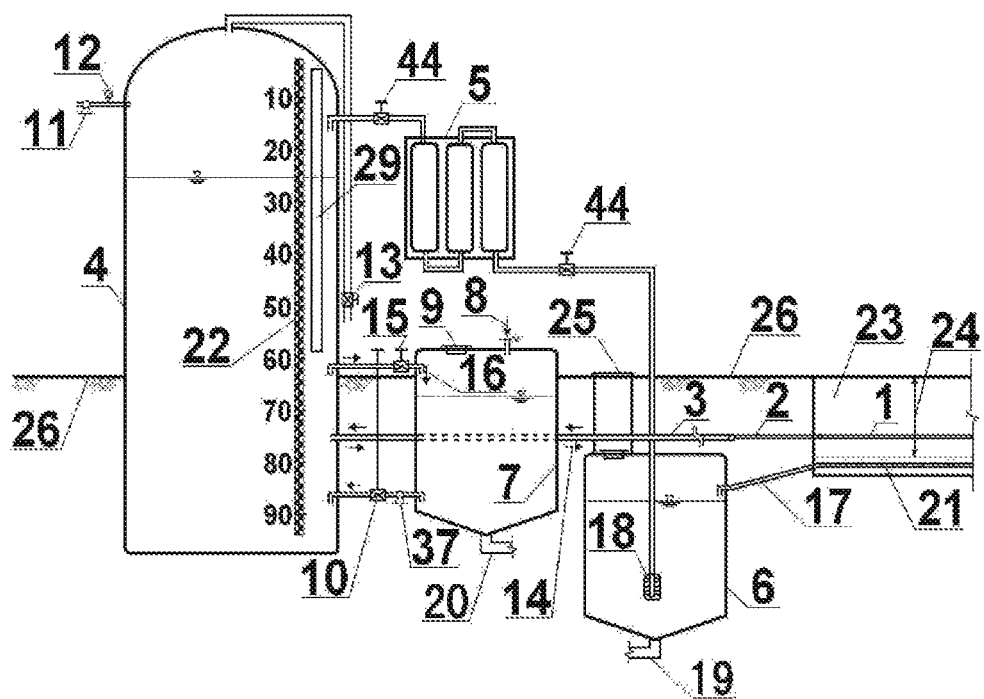

In the open field of agricultural areas, especially for areas where the water is in shortage, the above design usually is enough to divert moisture back to the reservoir. However, in order to divert back large storms' water which can saturated the soil pores in a short time period and without the collection of water the water may percolate downward quickly and lost, such as in arid or semi-arid areas consisting mostly sandy soils in the agricultural lands, an extra drainage design can be provided. FIGS. 1B, 2A, and 2B show the porous drainage pipe 21 below the root zone area for the above-mentioned purpose. The porous drainage pipe 21 is connected to the drainage pipe 17. A liner or hydrophobic layer 42 can be provided below the root zone to increase the effectiveness of water collection when necessary. The porous drainage pipe 21 is usually buried in a layer of sand or pea gravel drain 43.

The bi-direction-flow main conduit 3 is connected to a reservoir and pressure control tank 4, as shown in FIGS. 2A and 2B. Water can flow in and out, indicated by 14, of the reservoir and pressure control tank 4, responding to negative pressures adjusted in the tank 4, as well as negative pressures caused by the soils in the planting area. Calibration curves are established first for the soils in the agriculture area, which showing relationships of negative pressures and the moisture contents in soils in this area. For example, if the most favorable moisture contents for the plant needs during a growing period is 40% moisture contents, and calibration curve shows that the moisture contents is correspondence to 0.3 bars of pressure, the reservoir and pressure control tank 4 can then be adjusted to 0.3 bars. In this situation, when the plant absorbing more moisture from soils causing pressure becoming more negative in the soil, the water in the tank will automatically flow to the planting area. If there is a storm which causes the soil negative pressure becoming less negative, moisture will then be sucked into the bi-direction-flow branch conduit 2 through the moisture diffuser probe 1. In general, the most favorable moisture contents which a plant needs usually corresponds to negative pressures of 0.2 bar to negative 1 bar. The wilting point of soil moisture is usually negative 15 bars. Therefore, the reservoir and pressure control tank 4 is designed to control the pressure from 1 bar (about 1 atmospheric pressure) to negative 15 bars. The pressure in the reservoir and pressure control tank 4 can be controlled by a vacuum pump 11 or manually (without the need of electricity) with a pressure gage 12. For the control of negative pressure of the reservoir and pressure control tank 4 by the vacuum pump 11, the air volume in the tank 4 shall be roughly adjusted based on lowering or increasing the tank 4 water levels by lowering down or raising up through the water input valve, by water pump 37, and the water output valve 15, by gravity. Then the negative pressure is finely adjusted by a vacuum pump 11 and gage 12, by further lowering down water level or raising water level through water flowing back and forth the equalization tank 7.

The manually-controlled method mentioned above includes an atmospheric pressure increase valve 13, an equalization tank 7, a water input valve 10, a water output valve 15, a water pump 37, and a water supply input opening 8. The following example showing how the reservoir and pressure control tank 4 is adjusted to a negative pressure, say 0.4 bar:

(1) Shutdown both the water input and output valves 10 and 15, and all water connections to the reservoir and pressure control tank 4 (such as control valve 44);

(2) Open the pressure increase valve 13 (in this case, the pressure inside the air space of the tank 4 becoming 1 bar);

(3) Turn on the water pump 37 and water input valve 10, pump the water in the equalization tank 7 to reservoir and pressure control tank 4, until water level reaching to an arbitrary selected volume %, say 5% or say V1 (water volume in the tank can be seen through the water level observation tube 29, and the scale indicated by the tank volume indicator 22);

(4) Shutdown water pump 37, water input valve 10, and the pressure increase valve 13;

(5) Open water output valve 15, so water will flow to the equalization tank as indicated by 16, to let the water level in the tank 4 lower to the negative pressure selected (based on the plant needs in the planting area, in this case assuming 0.4 bar), as estimated as follows:

$$P1 \times V1 = P2 \times V2;$$

when P1=1 bar, V1=5%, P2=0.4 bar, therefore: V2=(1 bar×5%)/(0.4 bar)=12.5%; so, the water level is lower down to 12.5% (can be seen by water level observation tube 29, and tank volume indicator 22);

(6) Shut down water output valve 15.

The size of the reservoir and pressure control tank 4 can be designed in a way which the negative pressure only need to be adjusted in a longer period such as once in several weeks period or even longer. This is possible due to the water demand by plants are usually very slow, for most crops which is only about 300 to 400 mm/year, or average about 1 mm/day. The negative pressure of tank 4 also can be controlled automatically by a pressure gage 12 and a vacuum pump 11. A manhole 9 and a drain 20 is provided for the equalization tank 7. When the negative pressure of the tank 4 is selected, the negative pressure in the bi-direction-flow main conduit 3, the bi-direction-flow branch conduit 2, and the moisture diffuser probe 1 are all identical as that of the tank 4 and all these conduits and the probe are fill with water connecting to the reservoir and pressure control tank 4.

Water supply to the reservoir and pressure control tank 4 also can be provided by return water from the agricultural field as disclosed before. A water collection tank 6 is provided, which includes a sump pump 18, manhole 25, and a drain 19. Control valves 44 are provided to control the water flow through the water purification system 5 to filter water (and desalting when necessary) before entering to the reservoir and pressure control tank 4. In order to collect drainage water by gravity the water collection tank 6 can be built below ground surface 26.

Although the described system is designed for water irrigation, it also can be used for adding nutrients and/or herbicides/pesticides to the agricultural fields. When adding nutrients into the irrigation water by using the subject system (or any subsurface irrigation system), it is very important to use soluble organic or nano-organic fertilizers containing nutrients, in order to prevent hardening of soils. Through the above arrangements, the present invention can provide bi-directional flow in the subsurface irrigation system to automatically adjust moisture needs for plants. The proposed system can be used in any agricultural farms or greenhouses where conservation of irrigation water required, and liquid nutrient addition is needed. The subject system also can achieve many other objectives such as preventing agricultural land soil sandification, preventing root penetration into subsurface irrigation system, preventing soil particles blockage of conduit perforations, providing irrigation and same time preventing soil erosion in slope planting, facilitating drainage and preventing water logging, and preventing rising groundwater to create soil salination.

3. Other Application Examples of the Present invention

The present invention can be applied to other areas where plants are growing on soils. It will be apparent to one of ordinary skill in the art that many changes and modifications are feasible for using the present invention. Several examples are provided here:

3.1 Flower Pot Auto-Feeder

Figure 3A:
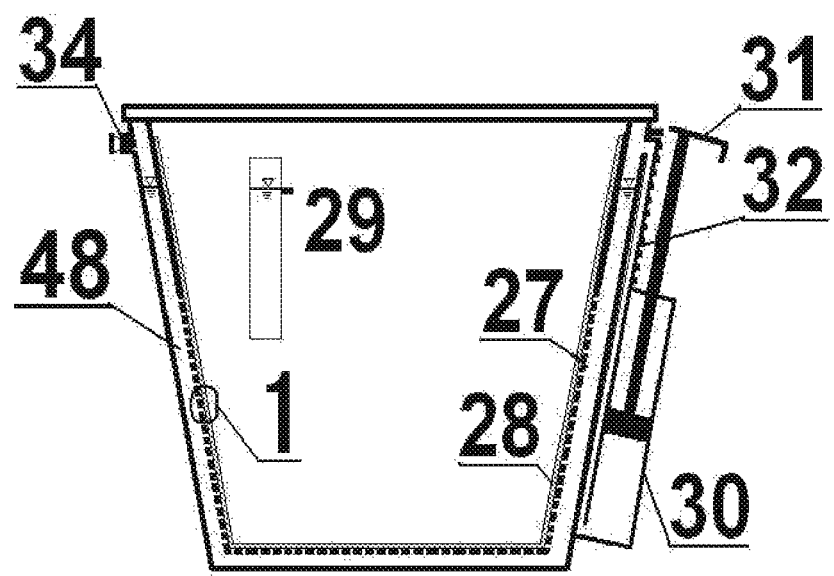
FIGS. 3A and 3B show an embodiment of the flower pot using the auto watering system of the present invention, where
Figure 3B:
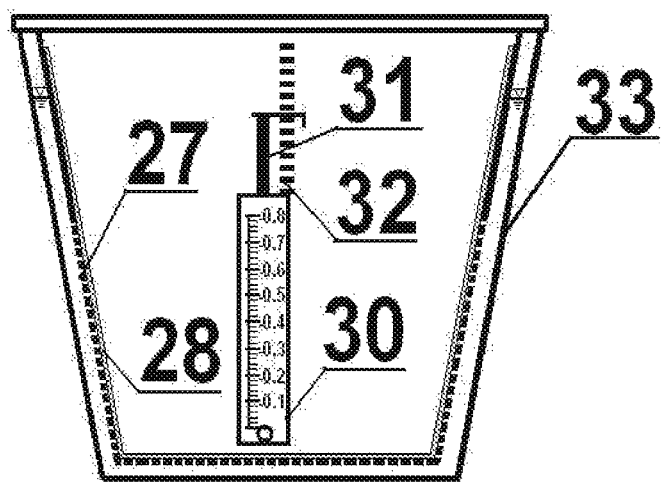

Watering of plants in the household flower pot may be a problem when there is a need to be away for a long period of time from home, such as on a vacation. FIGS. 3A and 3B show a design of a flower pot auto-feeder 33. As shown in FIG. 3A, a double-wall flower pot can be manufactured by plastics. Water or water with organic-nutrients fertilizers are filling into the annular space 48 through the pressure relief and water supply opening 34, this has the same function as the reservoir and pressure control tank 4. The inner wall of the flower pot is converted into a moisture diffuser probe 1, structured as that of the system described in FIGS. 1A to 1C, with inner layer 27 and outer layer 28. As shown in FIG. 3A, the negative pressure of the annular space 48 is created by a clear plastic syringe 30, with a L-shape handle 31 which can be adjusted and hold by a series of nails 32, and the air space in the syringe is connected to the top of the annular space 48. Similar to the manually-controlled method for the negative pressure control in the reservoir and pressure control tank 4 described above, the negative pressure can be controlled by pulling the syringe 30 upward to create vacuum, and therefore, negative pressure. The negative pressure can be relief by a pressure relief and water supply opening 34. The scale is provided in the syringe 30 and the water levels can be seen by the level observation tube 29, as described previously in FIG. 2B. The volume of the annular space of the subject flower pot auto-feeder 33 can be designed to hold enough water for weeks or a month or even longer periods of water supply.

3.2 Auto-Irrigation and Lighting System for Indoor Planting

FIGS. 4A to 4C show an example of indoor planting device 35 applying the subject auto irrigation system. This device is useful when people are growing organic food for own consumption, or for apartments where no outdoor garden space for vegetable growing. The system also can be industrialized for a large-scale indoor planting. The indoor planting device with auto irrigation system 35 can be designed in multi-levels as shown in FIG. 4A. In this case provision of extra lighting is required. As shown in FIG. 4C, if the natural lighting is used, a set of roof light collector 38, and a set of building wall light collector 39 can be used. Lights can be transmitted by optical fibers 40 to the light dividers/illuminators 41 for use by plants. Similar to that shown in FIG. 1A to 1D, the moisture diffuser probe 1, bi-direction-flow branch conduit 2, and bi-direction-flow main conduit 3 are provided. As shown in FIG. 4A, the reservoir and pressure control tank 4, and a syringe 30, a L-shape handle 31, multiple nails 32, a pressure relief and water supply opening 34 are also provided similar to that of FIGS. 3A and 3B. A pressure gage 45 is also provided to show the negative pressure.

3.3 Agricultural Farms in Outer Space

Building a space station is a dream of human. In order to survive in the outer space for a long time period food should be growing in the station. One of the difficulties of growing soil-based plants in outer space is no gravity to move the irrigation water in soils. The conventional above ground irrigation methods cannot be applied in the outer space. If traditional subsurface irrigation methods are used in outer space, pressure is required to push the water movement in soil pores. In this situation, soils would be saturated with water in order to move water in soil pores, which could cause roots without air and cause plants to die. This is different from the earth conditions where the gravity can drain the soil saturated water to field capacity and to keep some air volumes in the soil pores.

The above difficulties can be solved by the present invention. The subject subsurface irrigation system is based on unsaturated flow under negative pressure created by soil moisture itself. Water movement in soil pores in the outer space farms is affected by the pore water pressure created by soil moisture itself, and no relationship to outside forces such as zero gravity or controlled air pressure in the space station. Since the present invention is using negative pressure created by the soil moisture and pressure controlled by the water reservoir and pressure control tank 4, application of the subject system will not be affected by other outside variables. Therefore, the system shown in FIGS. 2A, 2B, 4A, and 4B can be also applied in the outer space farms. The application of the present invention can solve the planting difficulties in outer space. A combination of the multiple levels planting design as shown in FIG. 4A can be enlarged to become a large-scale system in the outer space. Or the system as shown in FIGS. 1A to 1D and 2A and 2B also can be used in a large agricultural farm in outer space station.

3.4 Converting Deserts into Arable Farms

Desertification is recognized to be one of the greatest ecological crises on earth. Desertification on earth is expanding at alarming rates. It not only causes reduction of land productivity but also ecological-environmental problems such as sand storms, reduction of species diversity, etc. Solutions to desertification control are urgently needed. However, the better approach is not just to control the expansion of desertification, is to convert deserts into arable lands.

Fundamental solution to convert deserts into arable farms require three systems working together: Moisture holding system, moisture conservation system, and moisture collection system. The present invention can play a key role of moisture conservation system and helping to hold and collect moisture. Water is in a great shortage in deserts, so to select a system which can prevent loss of water and collect any available water is critical. The subject FIGS. 1A to 1D and 2A and 2B designs can meet the requirements. In order to convert deserts into farms, mixing of a high-water absorption material into desert sands are necessary. One of the best materials is the organic fertilizers. In order to conserve as much water as possible, to build a liner (such as a clay layer) or a hydrophobic layer below the root zone area by additives can prevent water percolation loss. Any potential water sources, such as rains, snows, and condensation waters shall be collected. The subject system can be used to aid collecting and holding available water in deserts. The subject system also can aid plants growing in a most favorable moisture requirement conditions in deserts without the loss of water in deserts.

3.5 Example of Utilization in Semi-Arid Agricultural Farms

The following provides an example of a grape farm locating in a semi-arid area using the subject system. The farm is located in an area with a yearly average precipitation rate of 350 mm, and yearly evaporation rate of 1000 mm. Through investigations, it had identified that the root zone depth of the grape trees is average about 100 cm, soil permeability is about 10 mm/hour, average surface runoff coefficient is about 0.15. soil average pore ratio is about 40%, average field capacity is about 20%. The farm owner estimated that during the flowering and fruiting period it require about 550 mm total water consumption, and the daily maximum water demand is about 7 mm/day. During the growing period, it was tested that the best soil moisture contents are negative 0.4 to 0.6 bars. The current irrigation practice is above ground spray irrigation, using about 10 mm/hour of irrigation rate. The irrigation is continuing every time until soil is saturated with water. The farm owner is looking for a better irrigation method in this semi-arid area.

In order to conserve water, the subject method is evaluated together with other three selected methods: surface spray irrigation, subsurface percolation irrigation (similar to Case 1 as disclosed above), and subsurface drip irrigation (similar to Case 5 as disclosed above). Based on Equations (5), (9), and (15) listed above, and assuming the irrigation scheduling and irrigation rate selection are appropriate, the calculation results are summarized in the following Table 1:

TABLE 1

Summary of Calculation Results

| Irrigation Method | Surface Spray Irrigation | Subsurface Percolation | Subsurface Drip Irrigation | Present invention Method |
|---|---|---|---|---|
| Water Utilization Rate (%) | 35% | 47.5% | 95% | 100% |
| Total Yearly Water Amount Needed | 1571 mm | 1158 mm | 579 mm | 550 mm |
| Total Yearly Water Loss | 1021 mm | 608 mm | 29 mm | 0 mm |

The above data show that, the effective use of water by the other selected subsurface irrigation methods, excluding the subject method, would be 47.5 and 95% of water utilization rates. However, in reality, owing to non-homogeneity of soils, and difficulties in suitable arrangements of irrigation scheduling and irrigation rates, the actual water loss would be larger than that estimated above. The present invention is based on actual negative soil pressure to supply water automatically, control of water scheduling and irrigation rates are not problems.

To apply the subject method, the moisture diffuser probe 1 can be selected about 1 cm diameter size. The probe can be buried in vertical irrigation holes from 15 to 100 cm depths. Multiple vertical irrigation holes (about three to five) depending on sizes of the trees can be drilled surrounding each grape tree immediately outside of the root zone sphere. The holes are 5 to 10 cm (2 to 4 inch) diameter and backfilled with original soils, or fine sands after installation of the moisture diffuser probe 1 and the connecting bi-direction-flow branch conduit 2 is completed. The branch conduit 2 is vertically up to connect to the above ground horizontal bi-direction-flow main conduit 3. The conduit diameters for the branch conduit 2 and main conduit 3 are selected at 1.3 cm and 2.5 cm, respectively. If each main conduit is connected to about 200 to 250 trees, and the tree spacing is average at 2 m, then a 100,000 liter- (approximately 12,500 gallons-) reservoir and pressure control tank 4 can supply about 500 trees for a week period. If the reservoir and pressure control tank 4 is automatically controlled, the tank volume can be significantly reduced (such as reduce to a 55-gallon plastic tank) to save construction and operation costs.

Principles, methods and major apparatus are described above to explain the present invention. It is apparent to one of ordinary skill in the art that many changes and modifications may be made thereto without departing from the spirit or scope of the claims.

I claim:

1. A subsurface irrigation system, comprising:
a plurality of moisture diffuser probes 1,
a plurality of bi-direction-flow branch conduits 2, each conduit connecting to a set of the plurality of moisture diffuser probes 1,
a bi-direction-flow main conduit 3, connecting to the plurality of bi-direction-flow branch conduits 2,
a reservoir and pressure control tank 4, connecting to the bi-direction-flow main conduit 3,
an equalization tank 7, with input and output pipes connecting to the reservoir and pressure control tank 4,
a water purification system 5, connecting to the reservoir and pressure control tank 4,
a water collection tank 6, connecting to the water purification system 5,
a plurality of porous drainage pipes 21 being buried under root zones of an agricultural farm soil 23, and
a drainage pipe 17 having a first end connecting the plurality of porous drainage pipes 21, and a second end connecting to the water collection tank 6,
wherein the moisture diffuser probes 1 are buried in the root zone of the agricultural farm soil 23 and are tubular, disc, or irregular in shape, and further comprise:
(1) an inner layer 27 being made of a hard or soft inert porous material that is ceramic, glass, stainless steel, or plastics, and has a maximum pore size in a range of (P10)×p to (P50)×p, P10 being a size of 10% of diameters of clay or silty particles, if clay is absent, in the agricultural farm soil, P50 being a size of 50% of diameters of clay or silty particles, if clay is absent, in the agricultural farm soil, and p is an average percentage of porosity of the agricultural farm soil, and
(2) an outer layer 28 being made of an inert porous material that is geofabrics, porous ceramic, glass, metals, plastics, or fabric filters, and sizes of the pores of the outer layer 28 are greater than sizes of the pores of the inner layer 27 but smaller than pore size of the particles in the agricultural farm soil, wherein the outer layer 28 forms a protection layer for the inner layer 27.

2. The subsurface irrigation system as described in claim 1, wherein the reservoir and pressure control tank 4 further comprises:
   a vacuum pump 11 for creating a negative pressure in a range of from 1 bar to negative 15 bars,
   a pressure gage 12,
   an atmospheric pressure increase valve 13,
   a water input valve 10,
   a water output valve 15,
   a water pump 37,
   a water level observation tube 29,
   a tank volume indicator 22, and
   a water control valve 44,
   wherein the reservoir and pressure control tank 4 is used for storing irrigation water, nutrient, or both, and the irrigation water in the reservoir and pressure control tank 4 is under controlled negative pressure responding to a negative pressure in moisture contents in the agricultural farm soil.

3. The subsurface irrigation system as described in claim 1, wherein the water collection tank 6 further comprises:
   a sump pump 18,
   a manhole 25, and
   a water control valve 44,
   wherein the water collection tank 6 is used for collecting drainage water from the agricultural farm.

4. A method for providing irrigation water, water and nutrients, or both, by the system as described in claim 1, comprising:
   (1) establishing a calibration curve correlating moisture contents and negative pressure of soils in a planting area,
   (2) adjusting a water level in the equalization tank 7, finely adjusting a vacuum pump 11 and pressure gage 12 in the reservoir and pressure control tank 4 to adjust air volume and create the negative pressure in the reservoir and pressure control tank 4,
   (3) inputting water through a water supply input opening 8 to replenish water and liquid nutrients in the water equalization tank 7, and
   (4) supplying collected drainage return water from water collection tank 6 to the reservoir and pressure control tank 4,
   wherein the system as described in claim 1 provides irrigation water, water and nutrients, or both, under the negative pressure and through controlling the negative pressure to create a bi-directional flows to collect extra moisture beyond plant needs back to the reservoir and pressure control tank 4.

5. The method for providing irrigation water, water and nutrients, or both, according to claim 4, wherein steps (2) to (4) are performed through a manually-controlled method comprising:
   (i) shutting down all water connections to the reservoir and pressure control tank 4 by closing a water input valve 10 and a water output valve 15 of the reservoir and pressure control tank 4,
   (ii) opening a pressure increase valve 13, to reach the air pressure in the reservoir and pressure control tank 4 to the atmospheric pressure of P1,
   (iii) turning on a water pump 37 and the water input valve 10 of the reservoir and pressure control tank 4 and pumping the water in the equalization tank 7 to the reservoir and pressure control tank 4 until water level reaches to an air space volume in the reservoir and pressure control tank 4 reaching a pre-selected volume percentage V1 and adjusting V1 volume in the reservoir and pressure control tank 4 through a water level observation tube 29 and a scale indicated by a tank volume indicator 22,
   (iv) shutting down the water pump 37, the water input valve 10, and the pressure increase valve 13,
   (v) opening the water output valve 15, causing gravity flow of water to the equalization tank 7, until the negative pressure P2 needed by plants which is indicated by the calibration curve as described in claim 4 in the growing area reached, then according to a formula P1×V1=P2×V2, to calculated V2 air space volume in the reservoir and pressure control tank 4,
   (vi) Adjusting a new water level in the reservoir and pressure control tank 4 by the calculated V2 data, and
   (vii) shutting down water output valve 15.

6. The subsurface irrigation system according to claim 1, wherein the subsurface irrigation system provides automatic soil moisture control base on adjustment of negative irrigation water pressure to control water irrigation rates to real time consumption rates needed by plants in the agricultural farm soil, and collects extra moisture beyond plant's needs back to a water supply reservoir with a bi-direction-flow function.

7. A plant feeding apparatus, comprising
   (1) an inner wall being used as a moisture diffuser probe 1, the inner wall comprising a two-layered structure of an inner layer 27 and an outer layer 28,
   wherein the inner layer 27 is made of a hard or soft inert porous material that is ceramic, glass, stainless steel, or plastics, and has a maximum pore size in a range of (P10)×p to (P50)×p, P10 is a size of 10% of diameters of clay particles or silty particles, if clay is absent, in a planting soil, P50 is a size of 50% of diameters of clay particles or silty particles, if clay is absent, in the planting soil, and p represents an average percentage of porosity of the planting soil, the outer layer 28 is made of an inert porous material that is geofabrics, porous ceramic, glass, metals, plastics, or fabric filters, has a pore size that is greater than the pore size of the inner layer 27 but smaller than the size of the planting soil particles in the probes, and forms a protection layer of the inner layer 27,
   (2) a clear plastic syringe 30 having a L-shape handle 31,
   (3) a series of nails 32 for holding the L-shape handle 31, and
   (4) a pressure relief and water supply opening 34 for adding irrigation/nutrient water and relief pressure.

8. The plant feeding apparatus according to claim 7, wherein the plant feeding apparatus is a flower pot auto-feeder apparatus 33, and the flower pot auto-feeder further comprises
   a double-wall pod structure to form an annular space 48 for filling irrigation water and soluble organic fertilizers, and
   an air space in a top of the annular space 48 that connects to an air space in the clear plastic syringe 30.

9. The plant feeding apparatus according to claim 7, wherein the plant feeding apparatus is a multiple planting levels or trays of an indoor planting device that comprises
   (1) the plurality of moisture diffuser probes 1 comprising the inner layer 27 and the outer layer 28,
   (2) the clear plastic syringe 30,
   (3) the series of the nails 32,
   (4) the pressure relief and water supply opening 34, (5) a plurality of bi-direction-flow branch conduits 2, each conduit connecting to a set of the plurality of moisture diffuser probes 1,
(6) a bi-direction-flow main conduit 3 connecting to the plurality of bi-direction-flow branch conduits 2,
(7) a reservoir and pressure control tank 4 connecting to the bi-direction-flow main conduit 3,
(8) a set of roof light collectors 38,
(9) a set of building wall light collectors 39,
(10) an optical fiber 40 for light transmission, and
(11) a light divider/illuminator 41,
wherein the multiple planting levels or trays of an indoor planting device forms an auto irrigation system 35.

10. An outer space agricultural farm containing multiple planting levels/trays located inside an outer space station, with a smaller auto irrigation/nutrient addition system 35 or a larger auto irrigation/nutrient addition system, comprising:
    (1) a plurality of moisture diffuser probes 1, the plurality of moisture diffuser probes 1 comprising
        (i) an inner layer 27, manufactured with a hard or soft inert porous material that is ceramic, glass, stainless steel, or plastics, having a maximum pore size in a range of (P10)×p to (P50)×p, wherein P10 is a size of 10% of diameters of clay particles or silty particles, if clay is absent, in a soil, P50 is a size of 50% of diameters of clay particles or silty particles, if clay is absent, in the soil, and p represents an average percentage of porosity of particles in the soil,
        (ii) an outer layer 28, manufactured with an inert porous material that is geofabrics, porous ceramic, glass, metals, plastics, or fabric filters, having a pore size of greater than the pore size of the inner layer 27 and smaller than the size of the particles in the soil of a planting area, and forming a protection layer of the inner layer 27,
    (2) a plurality of bi-direction-flow branch conduits 2, each conduit connecting to a set of the plurality of moisture diffuser probes 1,
    (3) a bi-direction-flow main conduit 3, connecting to the plurality of bi-direction-flow branch conduits 2,
    (4) a reservoir and pressure control tank 4, connecting to the bi-direction-flow main conduit 3,
    (5) a pressure relief and water supply opening 34 for a smaller auto irrigation/nutrient addition system,
    (6) an equalization tank 7 for water supplying to and removal from and for pressure relief or increase of the reservoir and pressure control tank 4, optionally when a large planting system is used,
    (7) a set of light collectors 38,
    (8) a set of light collectors 39,
    (9) optical fibers 40 for light transmission,
    (10) light dividers and illuminators 41,
    (11) a clear plastic syringe 30 having an L-shaped handle 31, optionally when a small planting system is used,
    (12) a series of nails 32 for holding the L-shape handle 31, optionally when a small system is used.

11. The outer space agricultural farm according to claim 10, wherein the equalization tank 7 is for a large agricultural farm for water supplying to and removal from and for pressure relief or increase of the reservoir and pressure control tank 4 which comprises
    a pressure gage 12,
    a vacuum pump 11,
    a pressure increase valve 13,
    a water pump 37,
    a water input valve 10, and
    a water output valve 15.

12. A method for providing irrigation water and/or water and nutrients under negative pressure and through controlling of the negative pressure to create bi-direction flows to collect extra moisture beyond plant needs back to the reservoir and pressure control tank 4 for a large agricultural farm in an outer space auto subsurface irrigation or liquid nutrient addition system as defined in claim 10, comprising:
    (1) establishing calibration curves correlating moisture contents and negative pressures of soils in the planting area,
    (2) creating negative pressures of the reservoir and pressure control tank 4 by adjusting air volume in the tank 4 by lowering down water or raising up water levels through water in the reservoir and pressure control tank 4, and then fine adjusted by a vacuum pump 11 and pressure gage 12 for a larger agricultural farm, and
    (3) to replenish the water in the water equalization tank 7 to the reservoir and pressure control tank 4 by input water through water supply input valve 10.

\* \* \* \* \*